United States Patent
Arai

(10) Patent No.: US 11,215,900 B2
(45) Date of Patent: Jan. 4, 2022

(54) SHAKE CORRECTION DEVICE, OPTICAL UNIT WITH SHAKE CORRECTION FUNCTION, AND METHOD OF MANUFACTURING SAME

(71) Applicant: NIDEC SANKYO CORPORATION, Nagano (JP)

(72) Inventor: Tsutomu Arai, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 308 days.

(21) Appl. No.: 16/556,544

(22) Filed: Aug. 30, 2019

(65) Prior Publication Data
US 2020/0073203 A1   Mar. 5, 2020

(30) Foreign Application Priority Data
Aug. 30, 2018 (JP) .............................. JP2018-161631

(51) Int. Cl.
*G03B 5/06* (2021.01)
*G02B 27/64* (2006.01)

(52) U.S. Cl.
CPC .............. *G03B 5/06* (2013.01); *G02B 27/646* (2013.01); *G03B 2205/0007* (2013.01)

(58) Field of Classification Search
None
See application file for complete search history.

(56) References Cited

U.S. PATENT DOCUMENTS

| | | | |
|---|---|---|---|
| 8,842,355 B2* | 9/2014 | Lipton | G02B 7/04 359/233 |
| 2010/0091120 A1* | 4/2010 | Nagata | G02B 27/646 348/208.4 |
| 2015/0293372 A1* | 10/2015 | Hamada | G02B 27/646 359/557 |
| 2018/0309931 A1* | 10/2018 | Minamisawa | G02B 7/026 |
| 2018/0321505 A1* | 11/2018 | Minamisawa | G02B 27/646 |

FOREIGN PATENT DOCUMENTS

JP           2016061958 A           4/2016

\* cited by examiner

*Primary Examiner* — Clayton E. LaBalle
*Assistant Examiner* — Dennis Hancock
(74) *Attorney, Agent, or Firm* — Cantor Colburn LLP

(57) ABSTRACT

A shake correction device may include a housing unit; a movable body; a fixed body; a swing support mechanism; a shake correction drive mechanism; and a posture return mechanism. The shake correction drive mechanism may include a magnet and a coil, the coil being configured to apply an electromagnetic force to the movable body. The posture return mechanism may include the magnet and a magnetic member, the magnetic member configured to urge the movable body toward the reference posture. The magnetic member may include a convex surface protruding, and the other body may include a radial positioning unit to press the convex surface of the magnetic member against the radial positioning unit by the attraction force to position the magnetic member in a direction orthogonal to the axial line. The radial positioning unit may include a concave surface with which the convex surface is contacted.

10 Claims, 8 Drawing Sheets

SHAKE CORRECTION DEVICE, OPTICAL UNIT WITH SHAKE CORRECTION FUNCTION, AND METHOD OF MANUFACTURING SAME

CROSS REFERENCE TO RELATED APPLICATION

The present application claims priority under 35 U.S.C. § 119 to Japanese Application No. 2018-161631 filed Aug. 30, 2018, the entire content of which is incorporated herein by reference.

FIELD OF THE INVENTION

At least an embodiment of the present invention relates to a shake correction device for performing a shake correction on an optical module mounted on a camera-equipped mobile terminal, an optical unit with a shake correction function, and a method of manufacturing the same.

BACKGROUND

In an optical unit used in an optical device such as an imaging apparatus mounted on a mobile terminal, a drive recorder, an unmanned helicopter, or the like, to suppress a disturbance in a captured image due to a shake, a function has been developed to correct the shake by swinging the optical module to cancel the shake.

In the shake correction function, a configuration is adopted in which an optical module including an optical element is swingably supported with respect to a fixed body formed by a chassis of the optical device, and the optical module is swung in accordance with the shake by a shake correction drive mechanism.

The shake correction drive mechanism includes a magnet and a coil and is configured to drive the optical module by passing an electric current through the coil in a magnetic field of the magnet so that an electromagnetic force is effected on the optical module.

For example, in a configuration proposed in Japanese Unexamined Patent Application Publication No. 2016-61958 (hereinafter, referred to as Patent Literature 1), an optical module is swingably supported by a gimbal mechanism having fulcrums in two directions orthogonal to an optical axis direction of the optical module and the optical module (movable body) is swung to correct the shake.

In this type of shake correction drive mechanism, the optical module is held in a reference posture by an urging means when the shake correction drive mechanism is not energized. In Patent Literature 1, a plate spring is used as the urging means. The plate spring is bridged between the movable body and the fixed body, and includes a movable body side fixed unit fixed to the movable body, a fixed body side fixed unit fixed to the fixed body, and a meandering unit configured to meander between the movable body side fixed unit and the fixed body side fixed unit. The movable body is returned to the reference posture by an elastic restoring force of the plate spring (meandering unit) that deforms as the plate spring swings.

To allow for swinging of the movable body with respect to the fixed body, the meandering unit of the plate spring is formed to be thin and is susceptible to plastic deformation. Therefore, a handling of the plate spring is not easy, and a task of bridging the plate spring between the movable body and the fixed body is not easy during manufacture of the optical unit with a shake correction function. In addition, if an impact is applied to the optical unit with a shake correction function from outside and the optical module is displaced excessively, the plastic displacement may occur in the meandering unit and the optical module may not possibly be able to return to the reference posture.

SUMMARY

At least an embodiment of the present invention has been made in view of such circumstances, and returns a swung movable body to a reference posture without using a plate spring.

To achieve the above, in Japanese Patent Application No. 2017-092235, which is filed by the present applicant, it is proposed that a magnetic spring mechanism configured to generate an urging force by magnetism with a magnet of a shake correction drive mechanism is configured, and with this magnetic spring mechanism, the movable body is returned to the reference posture.

To ensure that the magnetic spring mechanism highly accurately functions, it is important to make a positional adjustment between the shake correction drive mechanism and the magnet, and it is necessary to achieve accurate positioning. At least an embodiment of present invention intends to improve the magnetic spring mechanism to increase the positional accuracy with respect to the magnet.

A shake correction device according to at least an embodiment of present invention includes a housing unit configured to hold an optical module, a movable body in which an optical axis of the optical module is able to be arranged on an axial line of the housing unit, a fixed body, a swing support mechanism configured to swingably support the movable body on the fixed body about a swing fulcrum on the axial line, a shake correction drive mechanism configured to swing the movable body, and a posture return mechanism configured to return the swung movable body to a reference posture, wherein the shake correction drive mechanism includes a magnet arranged in either one body of the movable body or the fixed body, and a coil arranged in the other body of the movable body or the fixed body, the coil being configured to apply an electromagnetic force to the movable body within a magnetic field of the magnet to drive the movable body, the posture return mechanism includes the magnet, and a magnetic member arranged in the other body, the magnet member configured to urge the movable body by an attraction force generated between the magnet and the magnetic member toward the reference posture, the magnetic member is provided with a convex surface protruding in a direction orthogonal to the axial line, and the other body is provided with a radial positioning unit configured to contact and press the convex surface of the magnetic member with and against the radial positioning unit by the attraction force to position the magnetic member in a direction orthogonal to the axial line, and the radial positioning unit includes a concave surface with which the convex surface is contacted.

The shake correction device is structured so that the convex surface provided in the magnetic member of the posture return mechanism is brought into contact with the concave surface of the other member, and thus, the magnetic member can be arranged to be abutted against the concave surface by the attraction force due to the magnetism for positioning, attachment of the magnetic member can be facilitated, and the contact between the concave surface and convex surface can enhance the positioning accuracy.

According to one aspect of the shake correction device, the convex surface of the magnetic member may be formed in an arc shape in cross section orthogonal to the axial line, and the concave surface may be formed in a V shape in cross section orthogonal to the axial line.

The convex surface having an arc-shaped cross section of the magnetic member abuts against the concave surface having a V-shaped cross section, and thus, the magnetic member can be positioned with high accuracy.

According to another aspect of the shake correction device, the convex surface and the concave surface are formed in an arc shape in cross section orthogonal to the axial line, and the concave surface may be larger in curvature radius than the convex surface.

The convex surface having an arc-shaped cross section of the magnetic member can abut, while rolling, against the concave surface having an arc-shaped cross section, and thus, even if there are slight variations in a diameter of the convex surface of the magnetic member, a deepest part of the concave surface of the positioning unit can unfailingly abut against an apex unit of the arc of the magnetic member, and a distance to the magnet can unfailingly be fixed at a constant distance.

According to another aspect of the shake correction device, the other body is provided with an axial positioning unit configured to contact and press an end unit of the magnetic member with and against the axial positioning unit by the attraction force to position the magnetic member in a direction along the axial line.

When the magnetic member is abutted against the axial positioning unit, a positioning state can be maintained by the attraction force generated between the magnetic member and the magnet, and thus, the positioning in the axial direction can also be facilitated.

In this case, the magnetic member may be formed in a rod-like shape, the convex surface and the concave surface may be formed to extend along the axial line, and the axial positioning unit may be formed in a surface shape to abut against the end unit of the magnetic member.

According to another aspect of the shake correction device, the magnetic member may be formed in a cylindrical shape. If the magnetic member is in the cylindrical shape, the magnetic member can be easily manufactured.

According to another aspect of the shake correction device, the other body may be formed with an adhesive reservoir configured to store an adhesive in a space with the magnetic member arranged in the positioning unit.

The adhesive reservoir may be a recessed unit opening at one end side in the axial direction. If, for example, an ultraviolet-curable adhesive is used to fix the magnetic member, the recessed unit can secure a wide region to which ultraviolet light can be irradiated, so that the adhesive can be reliably cured to fix the magnetic member. In addition, the adhesive can be cured without a long period of time, effective manufacture can be possible. It is noted that as the adhesive, not only the ultraviolet-curable adhesive but also a thermosetting adhesive may be used, or these may be used in combination.

According to another aspect of the shake correction device, the shake correction drive mechanism is provided on each of one side in a direction orthogonal to the axial line across the axial line and the other side therein, and the coil is connected with a flexible wiring board extending in a direction for linking the one side and the other side, the magnetic member of the posture return mechanism is arranged on each of the one side and the other side corresponding to a magnet of the shake correction drive mechanism on the one side and a magnet of the shake correction drive mechanism on the other side, the magnetic member arranged on the one side and the magnetic member arranged on the other side are different in position in the axial direction, and the movable body is supported to be inclined from the one side to the other side with respect to the reference position.

The force generated at the time of wiring the flexible wiring boards connected to the coil to be fixed to the fixed body may be transmitted to the movable body to incline the movable body. In a conventional optical unit including no posture return mechanism, a bias current is supplied to the coil of the shake correction drive mechanism to adjust the inclination of the movable body, however, in order that the movable body can be arranged in the reference posture when the force generated at the time of fixing the flexible wiring boards is transmitted to the movable body, when the movable body is supported and inclined as a result of differing the positions in the axial direction between the magnetic member on the one side and the magnetic member on the other side, the bias current to the coil can be set to "0" or a minimum current value, and power consumption can be reduced.

In an optical unit with a shake correction function using the shake correction device described above, the optical module is held in the housing unit, and a second flexible wiring board is connected to the optical module in a direction for linking the one side and the other side.

In order that the movable body can be arranged in the reference posture when the force generated at the time of fixing the flexible wiring board connected to the coil and the second flexible wiring board connected to the optical module to the fixed body is transmitted to the movable body, the positions in the axial direction are differed between the magnetic member on the one side and the magnetic member on the other side to accurately arrange the movable body in the reference posture.

A method of manufacturing the optical unit with a shake correction function includes arranging the movable body in the reference posture when the optical module is held in the housing unit to fix the flexible wiring board and the second flexible wiring board to the fixed body.

According to at least an embodiment of present invention, it is possible to return a swung movable body to a reference posture without using a plate spring by utilizing an attraction force of a magnet of a shake correction drive mechanism, a high positioning accuracy of a magnetic member configured to generate the attraction force with the magnet can be provided, and a high assembling workability can be provided.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An optical unit with a shake correction function according to at least an embodiment of the present invention will be described below with reference to drawings.

In the following description, three directions orthogonal to one another are each referred to as an X-axis direction, a Y-axis direction, and a Z-axis direction where it is assumed that an optical axis L (lens optical axis/optical axis of optical element) is placed in the Z-axis direction. Further, among the shakes in each of the directions, a rotation around the X-axis corresponds to a so-called pitching (vertical shake), and a rotation around the Y-axis corresponds to a so-called yawing (horizontal shake). Further, one side in the X-axis direction is denoted by +X, while the other side is denoted by −X, one side in the Y-axis direction is denoted by +Y, while the other side is denoted by −Y, and one side in the Z-axis direction (the side of a photographic subject/front side in the optical axis direction) is denoted by +Z, while the other side (the side opposite to the side of a photographic subject/rear side in the optical axis direction) is denoted by −Z for description.

(Brief Configuration of Optical Unit 100 with Shake Correction Function)

An optical unit with a shake correction function (hereinafter referred to as an optical unit) 100 according to the present embodiment is configured by a shake correction device 101 and an optical module 210 incorporated in the shake correction device 101.

Figure 8:
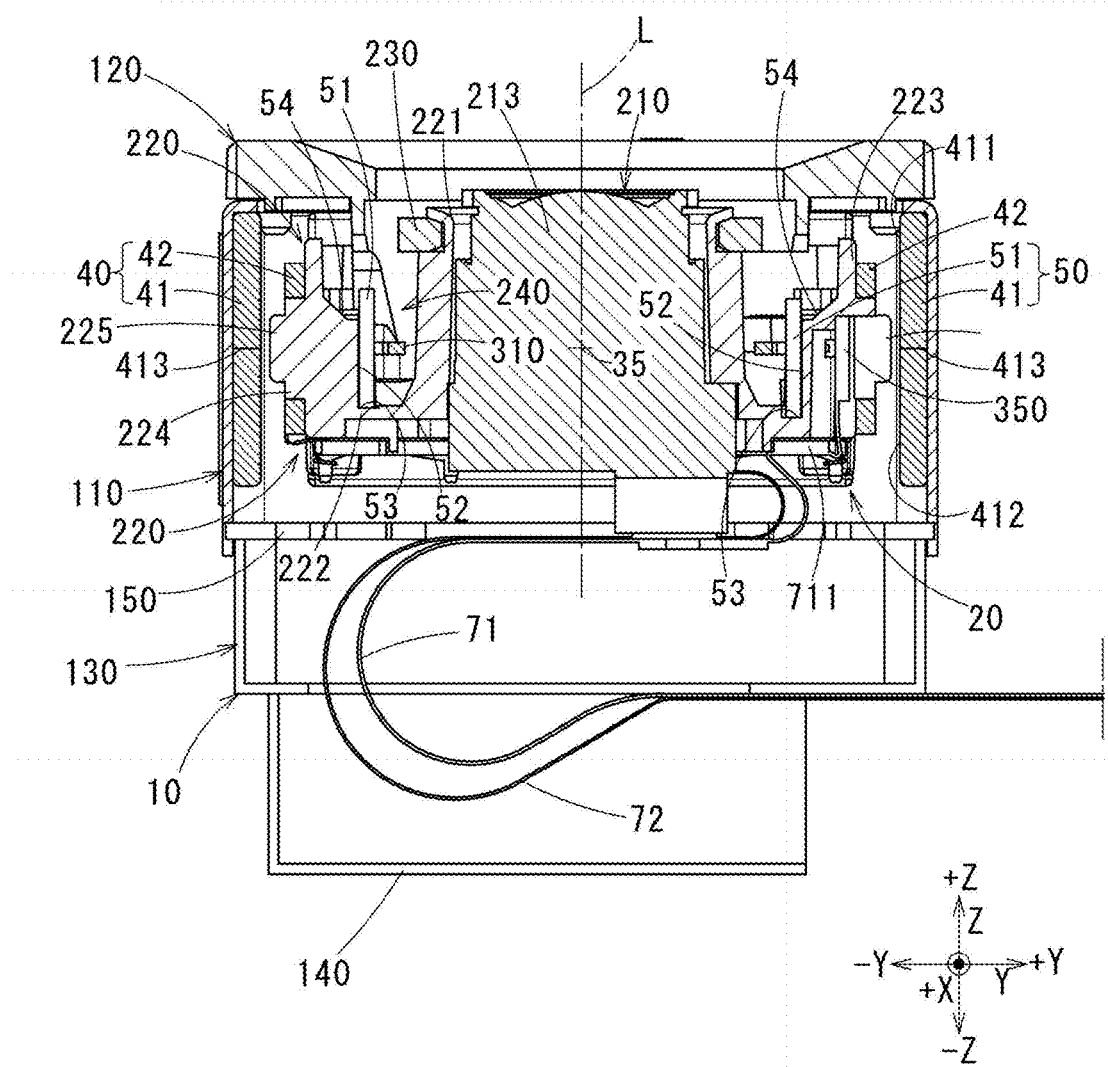
FIG. 8 is a longitudinal sectional view, similar to FIG. 3, of an optical unit with a shake correction function obtained by incorporating an optical module into the shake correction device according to one embodiment.

The optical unit 100 is a thin camera incorporated in an optical device (not illustrated) such as an imaging apparatus mounted on a mobile terminal, a drive recorder, an unmanned helicopter, or the like, and is mounted in a supported state on a chassis (device main body) of the optical device. The optical unit 100 according to the present embodiment is designed so that, as illustrated in FIG. 8, the optical module (an optical element and an imaging element) 210 is housed in a movable body 20 of the shake correction device 101 so that the optical axis L extends along the Z-axis direction, and is swung based on a result of detection of a shake by a shake detection sensor (not illustrated) such as a gyroscope or the like, so that the pitching and the yawing can be corrected.

The shake correction device 101 according to the present embodiment includes a fixed body 10, a movable body 20 in which the optical module 210 is housed, a gimbal mechanism 30, as a swing support mechanism, configured to ensure that the movable body 20 is swingably supported with respect to the fixed body 10, a shake correction drive mechanism 40 configured to swing the movable body 20, and a posture return mechanism 50 configured to return the swung movable body 20 to a reference posture.

Figure 5:
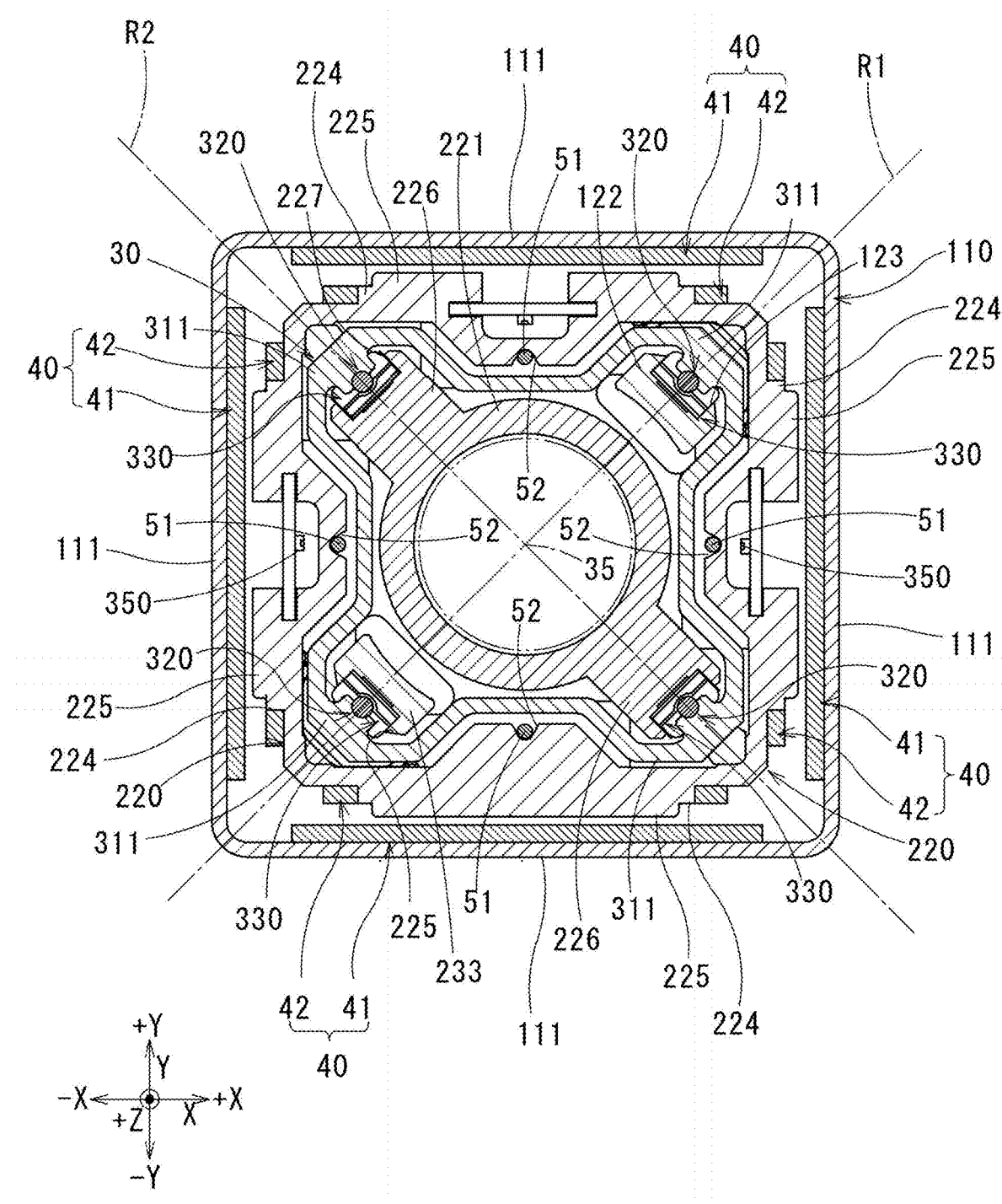
FIG. 5 is a cross-sectional view orthogonal to the axial line of the shake correction device of FIG. 1, with a movable body being arranged in a reference posture.
Figure 6:
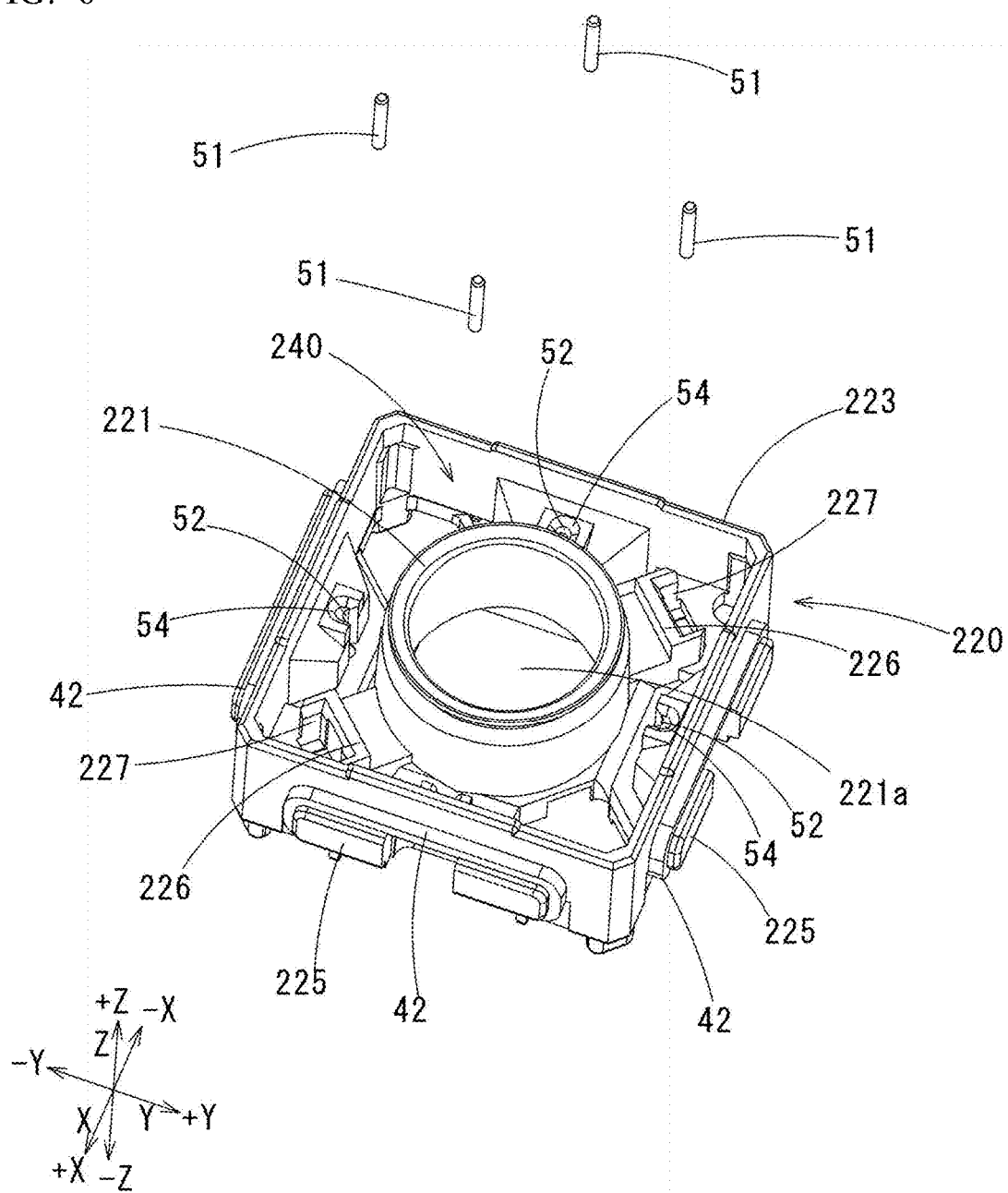
FIG. 6 is a perspective view of a holder frame and a magnetic member.

Further, as illustrated in FIG. 5, the movable body 20 is swingably supported around a first axial line R1 orthogonal to the Z-axis direction via the gimbal mechanism 30 with respect to the fixed body 10, and is also swingably supported around a second axial line R2 orthogonal to the Z-axis direction and the first axial line R1 direction. In the optical unit 100 in which the optical module 210 is incorporated, the optical axis L is arranged on the Z-axis, and when the movable body 20 is swung around the two axial lines (the first axial line R1 and the second axial line R2) orthogonal to the optical axis L, the pitching and the yawing are corrected.

(Configuration of Fixed Body 10)

Figure 1:
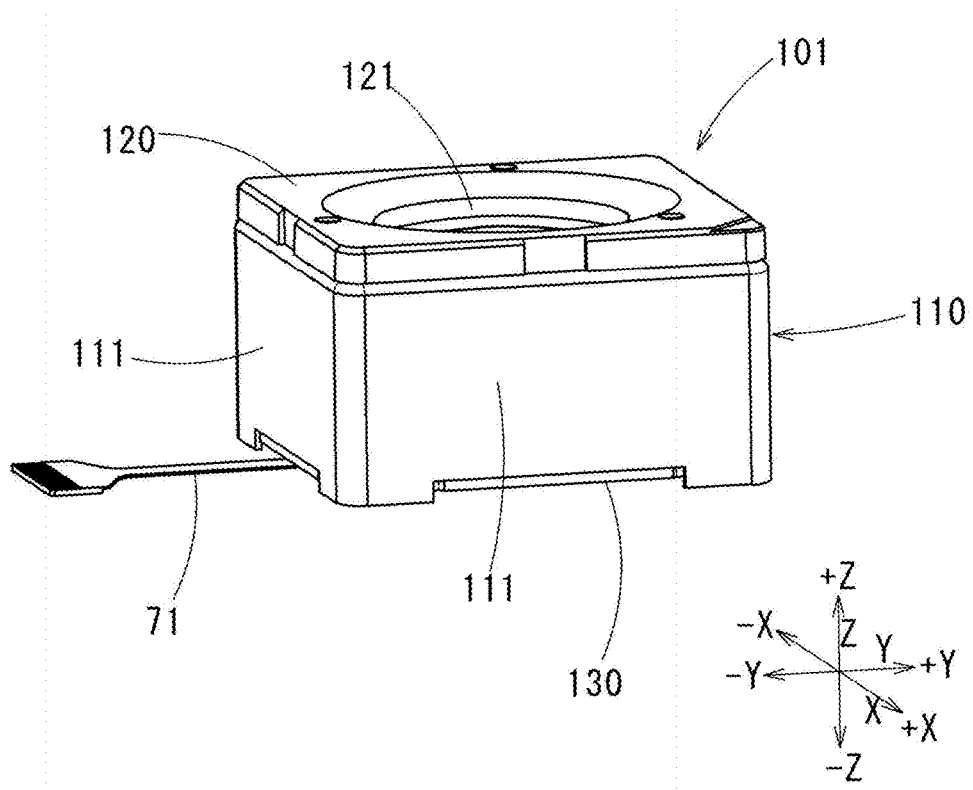
FIG. 1 is a perspective view illustrating an appearance of a shake correction device used in an optical unit with a shake correction function according to at least an embodiment of the present invention.

The fixed body 10 includes a square tubular case 110 surrounding the movable body 20, a cover frame 120 fixed on the case 110 (+Z in the Z-axis direction), a stopper plate 130 attached to a lower end unit of the case 110 (end unit on a −Z side in the Z-axis direction), and a lower case 140 and a bottom cover 150. It is noted that in the present embodiment, as illustrated in FIG. 1, FIG. 2 or the like, in the shake correction device 101, the fixed body 10 is configured by the case 110, the cover frame 120, and the stopper plate 130, and as illustrated in FIG. 8, the lower case 140 and the bottom cover 150 are attached when incorporated in the optical unit 100.

The case 110 is formed in a rectangle tubular shape by side plate units 111 arranged in four directions. The cover frame 120 is formed in a rectangular frame-like shape projecting inward in a radial direction from an end unit on one side +Z in the Z-axis direction of the case 110. Also, as illustrated in FIG. 1 or the like, a circular opening unit 121 is formed in a center portion of the cover frame 120, and light from a photographic subject is guided to the inside through the opening unit 121.

Figure 2:
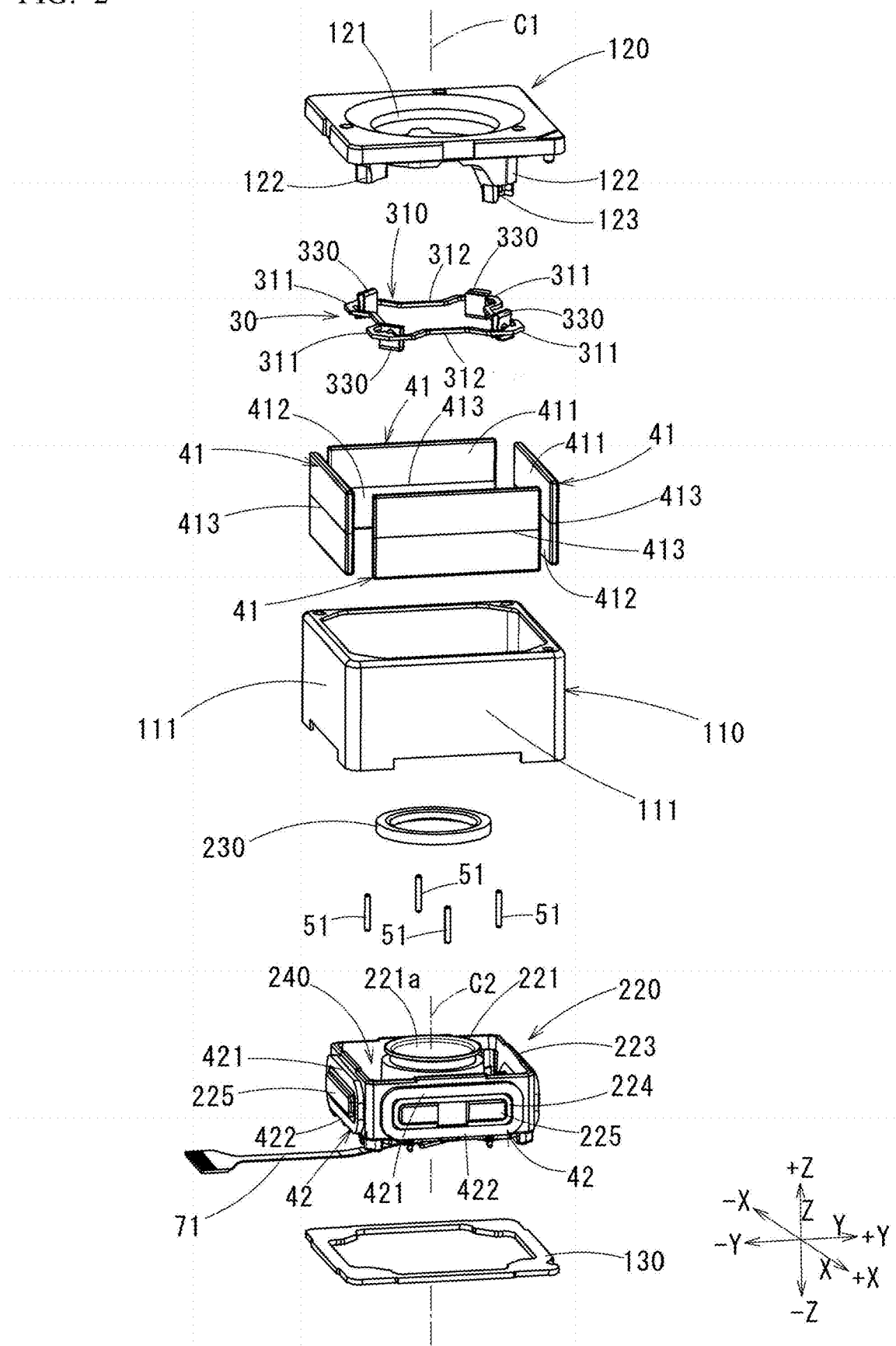
FIG. 2 is an exploded perspective view of the shake correction device of FIG. 1 exploded along an axial direction.

As illustrated in FIG. 2, the stopper plate 130 is formed in a rectangular frame shape, and is fixed to an inner peripheral unit of the lower end unit of the case 110.

It is noted that in the fixed body 10, a central axial line C1 of the case 110 is placed on the Z-axis.

(Configuration of Movable Body 20)

The movable body 20 includes a holder frame 220 configured to hold the optical module 210, and a weight 230 in a cylindrical shape, as a center-of-gravity position adjustment member, fixed on the holder frame 220 (one side +Z in the Z-axis direction).

The holder frame 220 includes a tubular holder holding unit 221 including a housing unit 221a configured to internally hold the optical module 210, a base unit 222 with its diameter enlarged in a flange-like shape at a lower end unit (end unit on −Z side in the Z-axis direction) of the holder holding unit 221, and an outer wall unit 223 provided upright on an outer peripheral unit of the base unit 222. The weight 230 is attached to a tip end unit of the holder holding unit 221 (end unit on one side +Z in the Z-axis direction).

Figure 3:
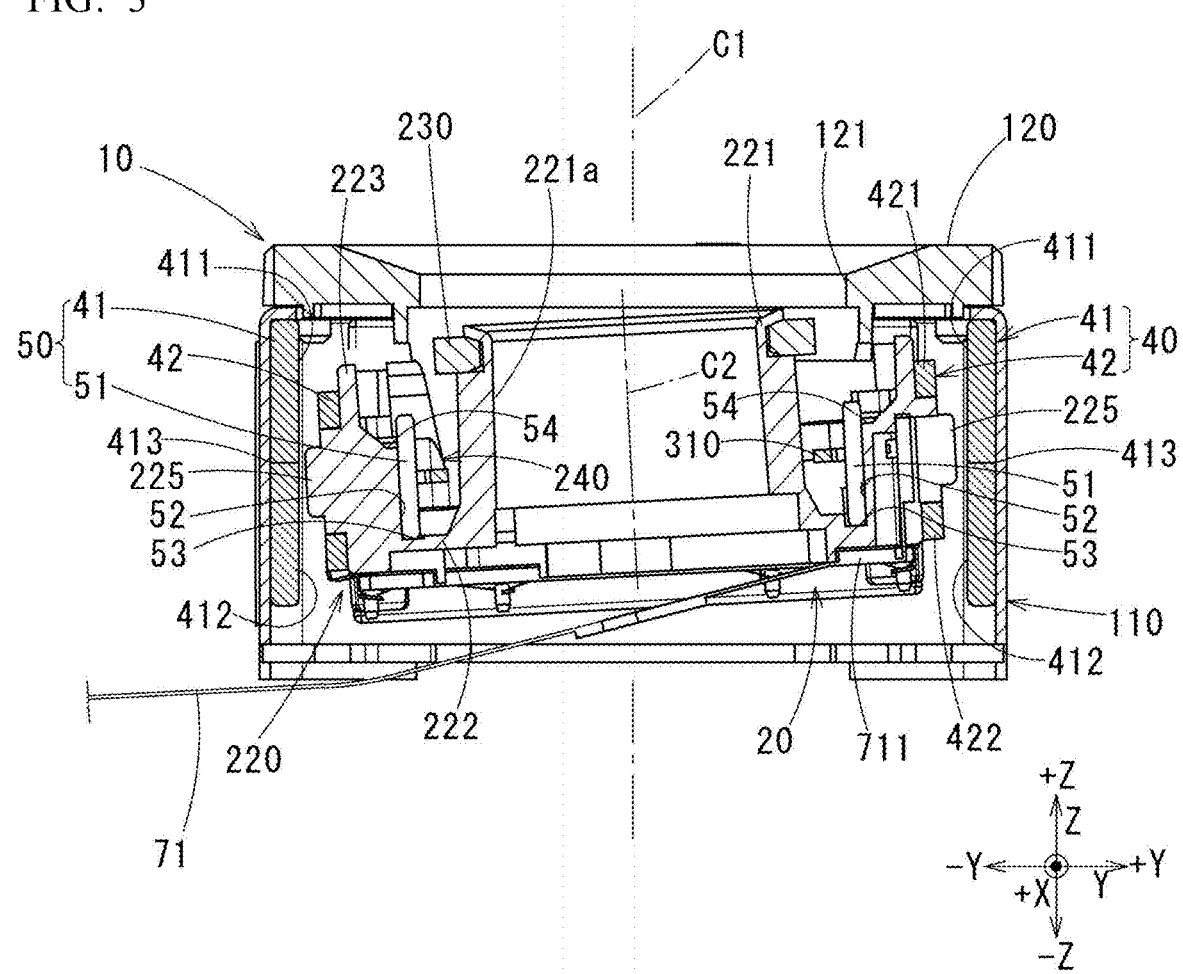
FIG. 3 is a longitudinal sectional view passing through an axial line of the shake correction device of FIG. 1.

Further, the outer wall unit 223 is formed in a square cylindrical shape, as viewed in the Z-axis direction, outward in a radial direction of the holder holding unit 221, and as illustrated in FIG. 5, coil holding units 224 configured to hold four coils 42 included in a shake correction drive mechanism 40 described later each provided on an outer peripheral unit of the outer wall unit 223. As illustrated in FIG. 3 to FIG. 6, a movable frame arrangement space 240 in which a movable frame 310 of the gimbal mechanism 30 described later is arranged is formed in a space created by the outer wall unit 223 and the holder holding unit 221. Further, in the coil holding units 224, a protruding unit 225 protruding further outward from an outer surface of the coils 42 (surface facing magnets 41) is arranged in a state where the coils 42 are held by the coil holding units 224, and as illustrated in FIG. 3 or the like, the protruding unit 225 faces the magnets 41. Therefore, when the movable body 20 is displaced in the X-axis direction or the Y-axis direction by an external force, the protruding unit 225 of the coil holding units 224 abuts against the magnets 41 to prevent the coils 42 and the magnets 41 from coming into contact with each other.

It is noted that in the present embodiment, the holder frame 220 is made of a synthetic resin, and the holder holding unit 221, the base unit 222, the outer wall unit 223, and the coil holding units 224 are integrally formed.

In this case, the movable body 20 is swingably supported with respect to the fixed body 10, as will be described later, in the shake correction device 101, the movable body 20 is supported at a slight inclination with respect to the fixed body 10, and thus, a central axial line (central axial line of the holder holding unit 221 in a tubular shape; an axial line of at least an embodiment of the present invention) C2 of the holder frame 220 of the movable body 20 does not strictly coincide with the Z-axis, however, a vertical direction of the holder frame 220 may be described as the Z-axis direction unless otherwise specified for convenience of description.

Further, in FIG. 2, the holder frame 220 is arranged such that the central axial line C2 is on the central axial line C1 of the case 110.

The coils 42 configuring the shake correction drive mechanism 40 is connected to a flexible wiring board 71 for power supply. In the flexible wiring board 71, at a base end unit, a frame-shaped substrate unit 711 in a rectangular frame-like shape arranged on the other side -Z in the Z-axis direction of the holder frame 220 is provided (see FIG. 3), and winding of each of the coils 42 of the shake correction drive mechanism 40 is connected to the frame-shaped substrate unit 711.

Figure 7:
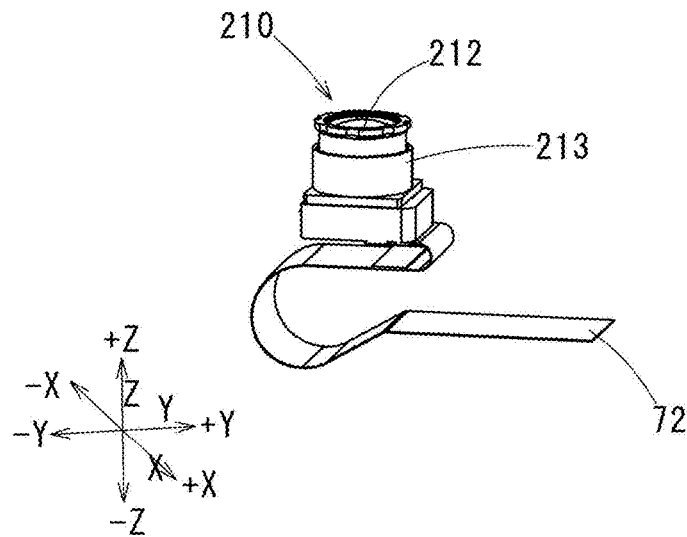
FIG. 7 is a perspective view illustrating an example of an optical module.

On the other hand, the optical module 210 held by the holder frame 220 of the movable body 20 includes, as illustrated in FIG. 7, a module holder 213 configured to hold a lens 212 as an optical element, an imaging element (not illustrated) or the like, and a flexible wiring board (second flexible wiring board of at least an embodiment of the present invention) 72 connected to the imaging element or the like, and the optical module 210 is held in the housing unit 221a inside the holder frame 220 while these components are integrally held by the module holder 213. In this case, the flexible wiring board 72 is drawn in the same orientation (in the embodiment, the Y-axis direction) as the flexible wiring board 71 connected to the coils 42 of the shake correction drive mechanism 40 (see FIG. 8).

In the present embodiment, the movable body 20 is configured by the holder frame 220, the coils 42, and the weight 230 not including the optical module 210 in the shake correction device 101, and in the optical unit 100, the optical module 210 is added thereto.

(Configuration of Shake Correction Drive Mechanism 40)

As illustrated in FIG. 5 and the like, the shake correction drive mechanism 40 is a magnetic drive mechanism utilizing planar magnets 41, and coils 42 configured to apply an electromagnetic force in the magnetic field of the magnets 41. In the present embodiment, four sets of combinations of magnets 41 and coils 42 are arranged at an interval of 90° in a circumferential direction of the movable body 20 (the holder frame 220). Further, each magnet 41 is held by the case 110, and each coil 42 is held by the holder frame 220, and in the present embodiment, the shake correction drive mechanism 40 is configured between the case 110 and the holder frame 220.

The magnets 41 are respectively held on the inner surfaces of each of the four side plate units 111 arranged at an interval of 90° in the circumferential direction of the case 110. Each side plate unit 111 is arranged on one side +X in the X-axis direction, the other side -X in the X-axis direction, one side +Y in the Y-axis direction, and the other side -Y in the Y-axis direction. Therefore, between the case 110 and the holder frame 220, the magnets 41 and the coils 42 are opposed to each other in all of the one side +X in the X-axis direction, the other side -X in the X-axis direction, the one side +Y in the Y-axis direction, and the other side -Y in the Y-axis direction.

In the present embodiment, the outer surface side and the inner surface side of the four magnets 41 are magnetized to different poles. Further, the magnets 41 are magnetized by being separated into two in the Z-axis direction, so that magnetic poles 411 and 412 located at the coil 42 side (inner surface side) are magnetized differently in the Z-axis direction (see FIG. 2 and FIG. 3). Therefore, a magnetization polarization line 413 separating both the magnetic poles 411 and 412 is arranged in parallel to a direction orthogonal to the Z-axis. In the two magnets 41 arranged respectively at the one side +X in the X-axis direction and the other side -X in the X-axis direction, the magnetization polarization line 413 is arranged along the Y-axis direction, and in the two magnets 41 arranged respectively at the one side +Y in the Y-axis direction and the other side -Y in the Y-axis direction, the magnetization polarization line 413 is arranged along the X-axis direction.

It is noted that the four magnets 41 have the same magnetization pattern on the outer surface side and the inner surface side. Thus, the magnets 41 adjacent in the circumferential direction are not attracted to each other, and therefore, it is easy to assemble, for example. Further, the case 110 is made of a magnetic material, and functions as a yoke for the magnets 41.

The coils 42 are air-core coils having no magnetic core (core), and are held by the holder frame 220 as described earlier. Further, each of the coils 42 is held at the one side +X in the X-axis direction of the holder frame 220, the other side -X in the X-axis direction thereof, the one side +Y in the Y-axis direction thereof, and the other side -Y in the Y-axis direction thereof. Among these, both coils 42 arranged on one side +X in the X-axis direction of the holder frame 220, and the other side -X in the X-axis direction thereof are formed in an annular shape by the windings, with the X-axis direction as the axial center direction of the coil. Further, both coils 42 arranged on one side +Y in the Y-axis direction, and the other side -Y in the Y-axis direction are formed in an annular shape by the windings, with the Y-axis direction as the axial center direction of the coil. Thus, any of the coils 42 is formed in an annular shape in which a direction orthogonal to the Z-axis direction is the axial center direction of the coil. Further, these four coils 42 are formed with the same planar shape and thickness (height) dimension.

Of the four coils 42, the two coils 42 in which the X-axis direction is the axial center direction of the coil are formed in a rectangular shape extending in the Y-axis direction. Further, the two coils 42 in which the Y-axis direction is the axial center direction of the coil are formed in a rectangular shape extending in the X-axis direction. Further, in each of the coils 42, the long sides arranged at the top and at the bottom are used as effective sides 421 and 422 facing the magnetic poles 411 and 412 of each of the magnets 41.

Further, although the movable body 20 swings for shake correction, the reference posture of the movable body 20 is a state where the both effective sides 421 and 422 of the coils 42 are arranged in parallel to the magnetization polarization line 413 of the opposing magnets 41 and arranged at vertically equal distances from the magnetization polarization line 413.

It is noted that in FIG. 5 and FIG. 8, reference numeral 350 denotes a sensor such as a Hall element configured to detect an operation of the shake correction drive mechanism 40. The sensor 350 is connected to the flexible wiring board 71, and feedback control of the shake correction drive mechanism 40 is performed based on the detection result.

(Configuration of Gimbal Mechanism 30)

In the shake correction device 101 according to the present embodiment, to correct the shake in the pitching direction and in the yawing direction, the movable body 20 is swingably supported around the first axial line R1 crossing in the Z-axis direction (in an optical axis L direction in which the optical module 210 is incorporated), and is also swingably supported around the second axial line R2 crossing the Z-axis direction and the first axial line R1. Therefore, the gimbal mechanism (swing support mechanism) 30 is configured between the fixed body 10 and the movable body 20.

In the present embodiment, the gimbal mechanism 30 has a rectangular movable frame 310, and the movable frame 310 is arranged in the movable frame arrangement space 240 of the holder frame 220, and between the bottom surface of the cover frame 120 of the fixed body 10 (the surface on the other side −Z in the Z-axis direction) and the holder frame 220 of the movable body 20.

The movable frame 310 is made of a metallic material having spring characteristics, and as illustrated in FIG. 2, is formed in a rectangular shape having four corner units 311 arranged at an interval of 90° in a circumferential direction, and a linkage unit 312 linking each of corner units 311. As illustrated in FIG. 5, spherical bodies 320 are fixed inside the four corner units 311 of the movable frame 310, respectively. Further, the linkage unit 312 has a shape curved in a direction orthogonal to the extending direction thereof and the Z-axis direction. Therefore, the movable frame 310 has spring characteristics capable of absorbing shocks when an impact is applied from the outside.

On the other hand, on the bottom surface (surface on the −Z side) of the cover frame 120, at the two corner units located diagonally opposite to each other in a direction in which the first axial line R1 extends, of the four corners around the Z-axis, protruding units 122 protruding toward the other side −Z in the Z-axis direction are provided, and groove units 123 are each formed radially outward of the protruding units 122. Also, as illustrated in FIG. 5, a contact spring 330 is attached to each groove unit 123, and of the four spherical bodies 320 of the movable frame 310, two spherical bodies 320 located diagonally opposite to each other in the direction in which the first axial line R1 extends are respectively supported by the contact springs 330.

Further, in the holder frame 220, at the two corner units located diagonally opposite to each other in a direction in which the second axial line R2 extends, protruding units 226 protruding radially outward from the holder holding unit 221 are integrally formed, and groove units 227 opening toward a radially outward direction are each formed at tip ends of the both protruding units 226. A contact spring 330 is attached to each groove unit 227, and of the four spherical bodies 320 of the movable frame 310, two spherical bodies 320 located diagonally opposite to each other in the direction in which the second axial line R2 extends are respectively supported by the contact springs 330.

Specifically, each contact spring 330 is bent to form a U-shaped vertical cross section by press-forming a plate member made of a metal such as elastically deformable stainless steel, and an elastic load (elastic force) is applied to the contact point with the spherical bodies 320 arranged on the movable frame 310 from a radially inner side to an outer side. That is, each spherical body 320 arranged at the four corner units 311 of the movable frame 310 is elastically brought into contact, from a radially outer side, to each contact spring 330 attached to the cover frame 120 of the fixed body 10 or the holder frame 220 of the movable body 20, and can swing at the contact unit.

In this case, the contact springs 330 fixed in the cover frame 120 face each other to form a pair in the first axial line R1 direction, and configure a first swing fulcrum between the spherical bodies 320 of the movable frame 310. On the other hand, the contact springs 330 fixed in the holder frame 220 face each other to form a pair in the second axial line R2 direction, and configure a second swing fulcrum between the spherical bodies 320 of the movable frame 310. Therefore, a swing center position (swing fulcrum) 35 of the movable body 20 is arranged at the intersection of the first axial line R1 and the second axial line R2 in which the first swing fulcrum and the second swing fulcrum are combined.

In this way, since each spherical body 320 of the movable frame 310 is slidably in contact with the contact springs 330, the holder frame 220 of the movable body 20 is swingably supported with respect to the cover frame 120 of the fixed body 10. Further, in the gimbal mechanism 30 thus configured, an urging force of each of the contact springs 330 is set equally. It is noted that in the present embodiment, a magnetic drive mechanism is used for the shake correction drive mechanism 40, and thus, both the movable frame 310 and the contact springs 330 used for the gimbal mechanism 30 are made from a nonmagnetic material.

Further, in the present embodiment, the movable frame 310 is arranged at the same height position (the same position in the Z-axis direction) as the coil holding units 224.

Therefore, as seen from the direction orthogonal to the Z-axis direction, the gimbal mechanism 30 is arranged at a position overlapping with the center position of the Z-axis direction of the coils 42 of the shake correction drive mechanism 40.

(Configuration of Posture Return Mechanism 50)

Figure 4:
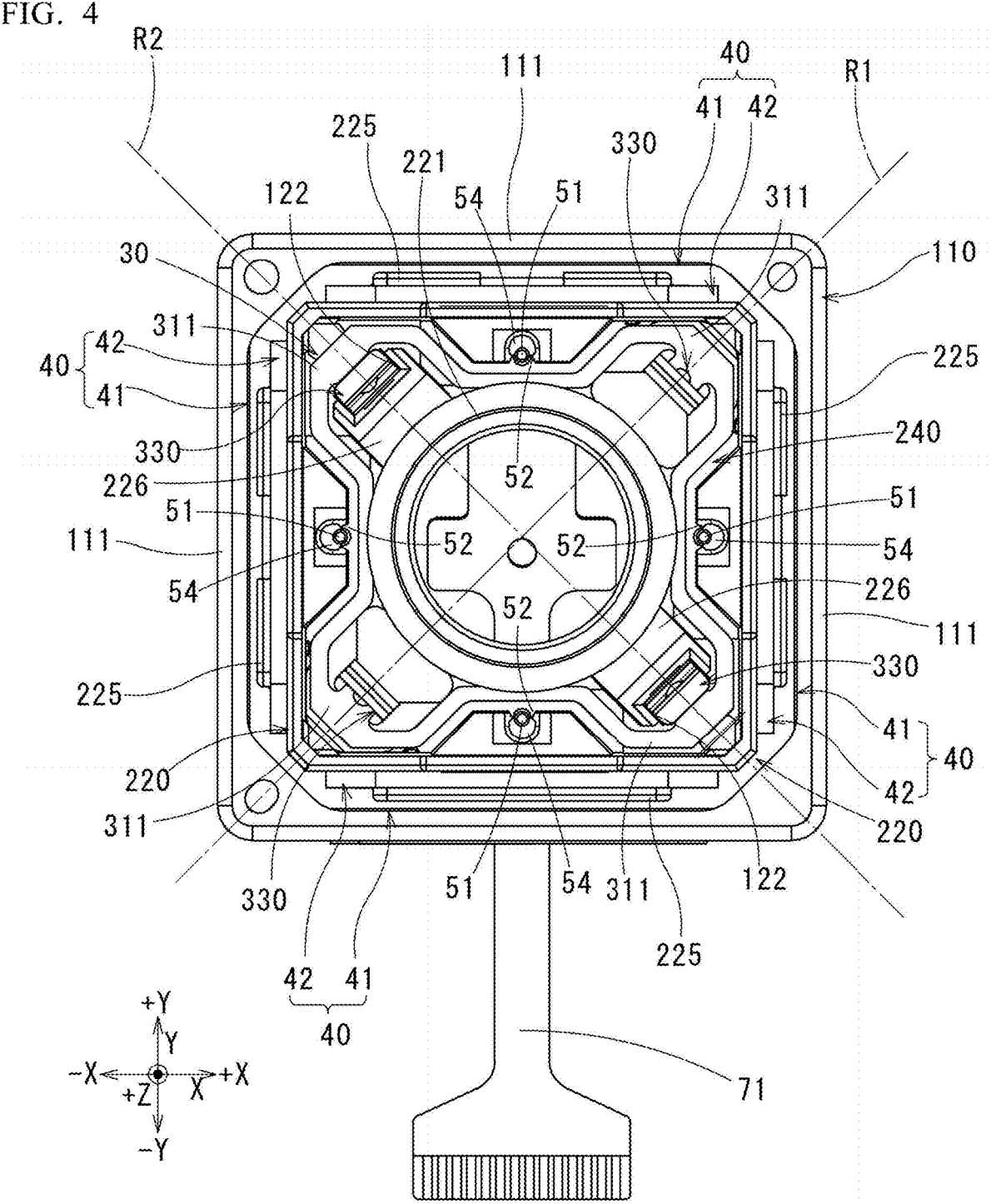
FIG. 4 is a plan view of the shake correction device of FIG. 1 with a cover frame being removed.

A rod-shaped magnetic member 51 is provided at a radially inward position of each coil holding unit 224 of the holder frame 220. The holder frame 220 is formed with concave grooves 52 along the Z-axis direction. Specifically, as illustrated in FIG. 4, on a back surface side of each coil holding unit 224 of the holder frame 220, and radially inside at an intermediate position in a longitudinal direction of the effective sides (long sides) 421 and 422 of the coils 42 held by the coil holding unit 224, the concave grooves 52 are each formed along the Z-axis direction. Therefore, the concave grooves 52 are formed, around the Z axis, at a total of four locations, that is, one side +X and the other side −X in the X-axis direction, and one side +Y and the other side −Y in the Y-axis direction.

The rod-shaped magnetic members 51 are respectively fixed in these concave grooves 52. In the embodiment, the magnetic members 51 are formed in a cylindrical rod-like shape having the same length. Further, the concave grooves 52 configured to house the magnetic members 51 have an inner surface whose cross section orthogonal to the Z-axis is formed to have a recessed arc-like shape (concave surface), and are opened inward in the radial direction. Further, in each concave groove 52, an opening width is formed to gradually expand inward in the radial direction, and an outer peripheral surface of each magnetic member 51 is in contact with the inner surface of the deepest part of the concave groove 52. In this case, the concave groove 52 is formed to have a radius of curvature slightly larger than a radius of the outer circumferential arc surface (convex surface) of the magnetic member 51.

Further, the concave groove 52 is opened on one side +Z in the Z-axis direction, but is closed on the other side −Z by the base unit 222 of the holder frame 220, and is formed with a receiving unit 53 against which an end surface of the magnetic member 51 abuts.

The magnetic member 51 is pressed against the inner surface of the concave groove 52 as a result of an attraction force acting between the magnetic member 51 and the magnet 41 of the shake correction drive mechanism 40. Therefore, if a position in the Z-axis direction of a center of the longitudinal direction of the magnetic member 51 is set to the same as a position in the Z-axis direction of the magnetization polarization line 413 of the magnet 41 in the shake correction drive mechanism 40, a posture (reference posture) in which the axial line C1 of the movable body 20 coincides with the Z-axis can be achieved during non-excitation.

However, the flexible wiring board 71 is drawn to the shake correction drive mechanism 40 of the movable body 20, and further, the flexible wiring board 72 is drawn to the optical module 210 described later, and when these flexible wiring boards 71 and 72 are held to the fixed body 10, an elastic force of the flexible wiring boards 71 and 72 acts in a direction in which the movable body 20 is inclined. Therefore, even if the movable body 20 is arranged in the reference posture in a state before the flexible wiring boards 71 and 72 are fixed, the movable body 20 is shifted from the reference posture when the flexible wiring boards 71 and 72 are fixed. Consequently, the position of the magnetic member 51 in the Z-axis direction is adjusted so that the movable body 20 is arranged in the reference posture when the elastic force of the flexible wiring boards 71 and 72 acts.

That is, the movable body 20 is not swung in a direction orthogonal to a direction into which the flexible wiring boards 71 and 72 are drawn (in the embodiment, the Y-axis direction) across the Z-axis, that is, in the X-axis direction when the flexible wiring boards 71 and 72 are fixed, and thus, the two magnetic members 51 arranged on one side +X and the other side −X in the X-axis direction are arranged so that the magnetization polarization line 413 of the corresponding magnets 41 of the shake correction drive mechanism 40 and the center position of the magnetic member 51 in the Z-axis direction substantially coincide. Specifically, height positions (positions in the Z-axis direction) of the receiving unit 53 of the concave groove 52 of the holder frame 220 abutting against end surfaces of the two magnetic members 51 are set to coincide.

On the other hand, the two magnetic members 51 arranged on one side +Y and the other side −Y of the direction (the Y-axis direction) into which the flexible wiring boards 71 and 72 are drawn across the Z-axis, are differed in height position (position in the Z-axis direction) of the receiving unit 53 of the concave groove 52 of the holder frame 220.

FIG. 8 is a cross-sectional view of the optical unit 100 in which the optical module 210 is held by the holder frame 220 of the movable body 20 and the flexible wiring boards 71 and 72 are fixed to the fixed body 10, and in FIG. 8, in the magnetic member 51 arranged on one side +Y in the Y-axis direction, a position in the Z-axis direction is arranged to be slightly shifted to −Z side relative to the magnetic member 51 arranged on the opposite side (on the other side −Y in the Y-axis direction). As enlarged in FIG. 9, a position Z2 of the magnetic member 51 in the Z-axis direction at a middle position in the longitudinal direction of the magnetic member 51 is shifted downward to a −Z side relative to a position Z1 in the Z-axis direction of the magnetization polarization line 413 of the magnet 41 corresponding to the magnetic member 51 of the shake correction drive mechanism 40. Therefore, in a state illustrated in FIG. 9, the magnetic member 51 is urged toward one side +Z in the Z-axis direction by the attraction force of the magnet 41 as indicated by an arrow A.

For this reason, in a state before the flexible wiring boards 71 and 72 are fixed to the fixed body 10 while the optical module 210 is not provided in the holder frame 220, that is, in a state of the shake correction device 101, as illustrated in FIG. 3, the central axial line C2 of the holder frame 220 is arranged to be inclined with respect to the central axial line C1 of the fixed body 10 so that a portion on one side +Y in the Y-axis direction is located on the +Z side in the Z-axis direction from a portion on the opposite side (on the other side −Y in the Y-axis direction). In a state illustrated in FIG. 3, between the magnetic member 51 arranged on one side +Y in the Y-axis direction and the magnetic member 51 arranged on the opposite side (on the other side −Y in the Y-axis direction), and the corresponding magnets 41 of the shake correction drive mechanism 40, the attraction forces are balanced.

When the optical module 210 is held by the holder frame 220 and the flexible wiring boards 71 and 72 are fixed to the fixed body 10, the movable body 20 is pivoted by the elastic force of the flexible wiring boards 71 and 72 clockwise as illustrated in FIG. 3 (direction indicated by an arrow B in FIG. 9), then the movable body 20 is arranged in the reference posture, as illustrated in FIG. 8.

Figure 9:
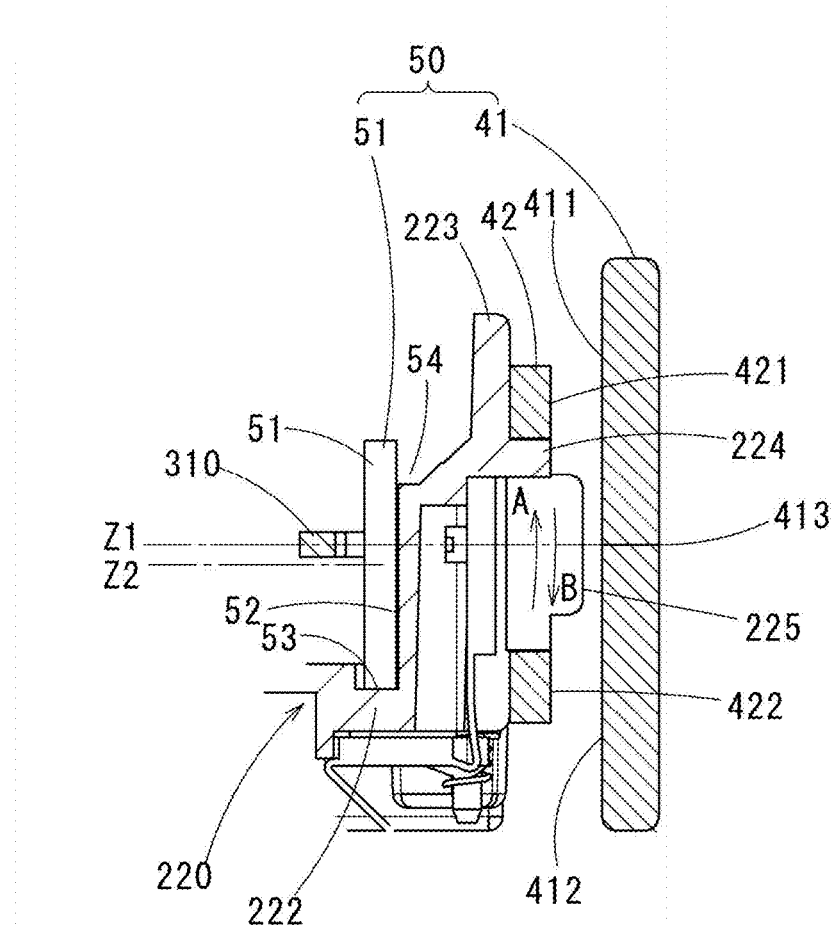
FIG. 9 is an enlarged view of an essential part of FIG. 8.

In other words, in the shake correction device 101 not including the optical module 210, a positional relationship between the center position of the magnetic member 51 in the Z-axis direction and the magnetization polarization line 413 of the magnet 41 is set so that an attraction force in a direction opposite to a direction in which the movable body 20 is pivoted when the optical module 210 is held by the holder frame 220 and the flexible wiring boards 71 and 72 are fixed to the fixed body 10, acts between the magnetic member 51 and the magnet 41 (so that an attraction force in a direction indicated by an arrow A acts on an elastic force in a direction indicated by the arrow B in FIG. 9). With a magnitude of the attraction force, the movable body 20 can be arranged in the reference posture in a state where the attraction force and the elastic force are balanced when the movable body 20 is pivoted by the elastic force of the flexible wiring boards 71 and 72.

Then, in the reference posture illustrated in FIG. 8, if energization to the coil 42 of the shake correction drive mechanism 40 is stopped after a shake correction is performed by the shake correction drive mechanism 40, the movable body 20 is returned to the reference posture by the attraction force between each magnetic member 51 and the corresponding magnet 41 of the shake correction drive mechanism 40.

That is, a posture return mechanism 50 configured to return the movable body 20 to the reference posture by generating the attraction force between and by the magnet 41 of the shake correction drive mechanism 40 and the magnetic member 51, is configured. The concave groove 52 is a radial positioning unit configured to set a distance between the magnetic member 51 and the magnet 41, and the receiving unit 53 is an axial positioning unit configured to decide a position of the magnetic member 51 in the Z-axis direction.

It is noted that the magnetic member 51 is housed in the concave groove 52, and in this state, fixed by an adhesive. An adhesive reservoir 54 configured to retain an adhesive is provided at an upper end unit (end unit on one side +Z in the Z-axis direction) of the concave groove 52. The adhesive reservoir 54 is formed in a concave shape toward +Z in the Z-axis direction, and the magnetic member 51 is arranged in a state where an end unit of the magnetic member 51 is projected to the adhesive reservoir 54. Therefore, the magnetic member 51 can be fixed to the holder frame 220 by filling the adhesive reservoir 54 with the adhesive. Further, for example, if an ultraviolet-curable adhesive is used, the adhesive reservoir 54 can secure a wide region with which the ultraviolet light is irradiated, so that the adhesive can be reliably cured to fix the magnetic member 51. As the adhesive, an ultraviolet-curable adhesive, a thermosetting adhesive, and the like can be used, and these may also be combined.

(Method of Manufacturing Optical Unit with Shake Correction Function)

To manufacture the optical unit 100 with the shake correction function by using the shake correction device 101 configured as described above, the shake correction device 101 illustrated in FIG. 3 is assembled first. In this state, as described above, the movable body 20 is inclined with respect to the central axial line C1 of the case 110 of the fixed body 10.

Then, the optical module 210 is held while being inserted in the housing unit 221a of the holder holding unit 221 in the holder frame 220. In this holding state, the optical axis L of the optical module 210 coincides with the central axial line C2 of the housing unit 221a.

After the optical module 210 is held, the lower case 140 is attached to the case 110, and the flexible wiring board 71 of the coil 42 and the flexible wiring board 72 of the optical module 210 are sandwiched and fixed, while being curved as illustrated in FIG. 8, between the lower case 140 and the bottom cover 150. At this time, when the flexible wiring boards 71 and 72 are fixed in a curved state, the elastic force acts on the movable body 20, and as described above, the movable body 20 in the inclined state is arranged in the reference posture.

In the reference posture, the magnets 41 and the coils 42 of the shake correction drive mechanism 40 are provided in four sets and, in any possible set, the two effective sides 421 and 422 of the coil 42 are parallel to the magnetization polarization line 413 of the magnets 41, and are arranged at vertically equal distances from the magnetization polarization line 413. Further, the movable frame 310 of the gimbal mechanism 30 and the respective spherical bodies 320 are provided, in the Z-axis direction, at the same height position as that of the magnetization polarization line 413 of the magnets 41.

It is noted that if the movable body 20 is slightly shifted from the reference posture after the assembly is completed, a slight current is supplied to the coils 42 of the shake correction drive mechanism 40 to perform adjustment; however, even in that case, the movable body 20 is positioned substantially in the reference posture by the attraction force by the magnetic member 51 and the magnets 41, and thus, only a slight amount of current (bias current) may be sufficient to be passed to the coils 42.

The flexible wiring board 71 of the shake correction drive mechanism 40 and the flexible wiring board 72 of the optical module 210 incorporated in the holder frame 220 are electrically connected to an upper control unit or the like provided on the main body side of the optical device.

In the manufacturing method, the magnetic member 51 is positioned by abutting against an inner surface of the concave groove 52 and an upper surface of the receiving unit 53 by being suctioned from an obliquely lower side (radially outer side and axially lower side) by the magnets 41.

In this case, in the embodiment, the concave groove 52 is also formed in a recessed arc-like shape for the cylindrical magnetic member 51 and the arc surfaces abut against each other, and thus, the magnetic member 51 abuts, while rolling, against the inner surface of the concave groove 52 and makes a point contact with a deepest part of the concave groove 52 in the X-axis direction or the Y-axis direction. As a result, a distance between the magnetic member 51 and the magnets 41 in the X-axis direction or the Y-axis direction is exactly set. The concave groove 52 has a recessed arc-like shaped cross section, but may have a V-shaped cross section. If the concave groove 52 is a concave groove having a V-shaped cross section, the magnetic member 51 is unlikely to be shifted to the left and right, so that the positioning accuracy, in particular, in a circumferential direction, can be enhanced.

On the other hand, a position of the magnetic member 51 in the Z-axis direction is set by the receiving unit 53 of the holder frame 220, and the position is set to be different in the drawing direction of the flexible wiring boards 71 and 72, and thus, the attraction force may be acted in a direction for pushing back the elastic force of the flexible wiring boards 71 and 72 between the magnetic member 51 and the corresponding magnet 41 of the shake correction drive mechanism 40. As a result, the movable body 20 can be accurately positioned in the reference posture.

It is noted that when the magnetic member 51 is attached to the shake correction device 101, if the magnetic member 51 is arranged in the concave groove 52, the attraction force from the corresponding magnet 41 of the shake correction drive mechanism 40 acts so that the magnetic member 51 can be brought into contact with and pressed against the inner surface of the concave groove 52, and as a result, the positioning task is easy. Further, after the magnetic member 51 is arranged in the concave groove 52, if an adhesive is injected into the adhesive reservoir 54, the magnetic member 51 can be fixed in a positioned state in the concave groove 52.

Therefore, with a simple task of housing the magnetic member 51 in the concave groove 52 of the holder frame 220 which is followed by fixation with the adhesive, the movable body 20 can be positioned, and thus, a task performance is high. Also when the magnetic member 51 is housed in the concave groove 52, unlike a press-fit into a hole, for example, a particularly large force is not required, and thus, the holder frame 220 made of resin is not deformed. Therefore, a thickness of the base unit 222 can be decreased, and this further facilitates miniaturization.

In at least an embodiment of the present invention, the magnetic member 51 may not necessarily be in a cylindrical shape. For example, only a portion in contact with the concave groove may be formed to have an arc-like shaped cross section, or may be formed in a prismatic shape or the like. The magnetic member may suffice to have a convex surface protruding in a direction orthogonal to the axial line C2. Further, when the magnetic member is formed into a prismatic shape, the concave groove may have a V-shaped groove against which two surfaces of corner units of the prism abut. As the concave groove, the radial positioning unit may suffice to have a concave surface allowing for a planar contact or a linear contact along the Z axis with a convex surface of the magnetic member.

Further, the magnetic member 51 may be spherical, and the concave groove may be concave spherical. If the magnetic member and the concave groove are formed in a spherical shape, the spherical surface of the concave groove will have both functions of a radial positioning unit and an axial positioning unit. Therefore, the receiving unit formed at an end unit of the concave groove may be formed not only in a flat surface but also in a concave surface, and may be formed in accordance with a shape of the end unit of the magnetic member.

The gimbal mechanism 30 is structured so that the spherical body 320 fixed to the movable frame 310 is contacted with the contact spring 330; however, the gimbal mechanism 30 may also be structured so that not only the spherical body 320 but also a spherical tip end surface obtained by forming a tip end surface of a rod-shaped member or the like into a spherical shape is contacted with the contact spring 330.

Further, the magnets 41 of the shake correction drive mechanism 40 is arranged in the case 110 of the fixed body 10 and the coil 42 is arranged in the holder frame 220 of the movable body 20; however, conversely, the magnet 41 may be arranged in the holder frame 220 of the movable body 20 and the coil 42 may be arranged in the case 110 of the fixed body 10. In that case, the magnetic member 51 and the concave groove 52 are arranged in the case 110 of the fixed body 10. In other words, the magnetic member 51 is arranged in a member arranged with the coil 42, that is, a member on the opposite side of the member arranged with the magnet 41 of the shake correction drive mechanism 40.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A shake correction device, comprising:
a housing unit configured to hold an optical module;
a movable body in which an optical axis of the optical module is arranged on an axial line of the housing unit;
a fixed body;
a swing support mechanism configured to swingably support the movable body on the fixed body about a swing fulcrum on the axial line;
a shake correction drive mechanism configured to swing the movable body; and
a posture return mechanism configured to return the movable body that is swung to a reference posture, wherein
the shake correction drive mechanism comprises: a magnet arranged in one of the movable body or the fixed body; and a coil arranged in an other of the movable body or the fixed body, the coil being configured to apply an electromagnetic force to the movable body within a magnetic field of the magnet to drive the movable body, the posture return mechanism comprises: the magnet; and a magnetic member arranged in the other body, the magnetic member configured to urge the movable body toward the reference posture by an attraction force generated between the magnet and the magnetic member,
the magnetic member comprises a convex surface protruding in a direction orthogonal to the axial line, and the other body comprises a radial positioning unit configured to press the convex surface of the magnetic member against the radial positioning unit by the attraction force to position the magnetic member in a direction orthogonal to the axial line, and
the radial positioning unit comprises a concave surface with which the convex surface is contacted.

2. The shake correction device according to claim 1, wherein the convex surface of the magnetic member is formed in an arc shape in cross section orthogonal to the axial line, and the concave surface is formed in a V shape in cross section orthogonal to the axial line.

3. The shake correction device according to claim 1, wherein the convex surface and the concave surface are formed in an arc shape in cross section orthogonal to the axial line, and the concave surface is larger in curvature radius than the convex surface.

4. The shake correction device according to claim 1, wherein the other body comprises an axial positioning unit configured to press an end unit of the magnetic member against the axial positioning unit by the attraction force to position the magnetic member in a direction along the axial line.

5. The shake correction device according to claim 4, wherein the magnetic member is formed in a rod shape, the convex surface and the concave surface are formed to extend along the axial line, and the axial positioning unit is formed in a surface shape to abut against the end unit of the magnetic member.

6. The shake correction device according to claim 1, wherein the magnetic member is formed in a cylindrical shape.

7. The shake correction device according to claim 1, wherein the other body comprises an adhesive reservoir configured to store an adhesive in a space with the magnetic member arranged in the positioning unit.

8. The shake correction device according to claim 1, wherein the shake correction drive mechanism is provided on each of one side in a direction orthogonal to the axial line across the axial line and an other side therein, and the coil is connected with a flexible wiring board extending in a direction for linking the one side and the other side,
the magnetic member of the posture return mechanism is arranged on each of the one side and the other side corresponding to a magnet of the shake correction drive mechanism on the one side and a magnet of the shake correction drive mechanism on the other side, the magnetic member arranged on the one side and the magnetic member arranged on the other side are different in position in the axial direction, and
the movable body is supported to be inclined from the one side to the other side with respect to the reference position.

9. An optical unit comprising a shake correction function using the shake correction device according to claim 8, wherein the optical module is held in the housing unit, and a second flexible wiring board is connected to the optical module in a direction for linking the one side and the other side.

10. A method of manufacturing the optical unit with a shake correction function comprising a housing unit configured to hold an optical module; a movable body in which an optical axis of the optical module is arranged on an axial line of the housing unit; a fixed body; a swing support mechanism configured to swingably support the movable body on the fixed body about a swing fulcrum on the axial line; a shake correction drive mechanism configured to swing the movable body; and a posture return mechanism configured to return the movable body that is swung to a reference posture, wherein the shake correction drive mechanism comprises: a magnet arranged in one of the movable body or the fixed body; and a coil arranged in an other of the movable body or the fixed body, the coil being configured to apply an electromagnetic force to the movable body within a magnetic field of the magnet to drive the movable body, the posture return mechanism comprises: the magnet; and a magnetic member arranged in the other body, the magnet member configured to urge the movable body toward the reference posture by an attraction force generated between the magnet and the magnetic member, the magnetic member comprises a convex surface protruding in a direction orthogonal to the axial line, and the other body comprises a radial positioning unit configured to press the convex surface of the magnetic member against the radial positioning unit by the attraction force to position the magnetic member in a direction orthogonal to the axial line, and the radial positioning unit comprises a concave surface with which the convex surface is contacted, comprising:

arranging the movable body in the reference posture when the optical module is held in the housing unit to fix the flexible wiring board and the second flexible wiring board to the fixed body.

* * * * *